United States Patent [19]

Giger

[11] Patent Number: 4,917,429

[45] Date of Patent: Apr. 17, 1990

[54] TRUCK BED DIVIDER ASSEMBLY

[76] Inventor: John D. Giger, 9083 Calle Lucia, Lakeside, Calif. 92040

[21] Appl. No.: 300,319

[22] Filed: Jan. 23, 1989

[51] Int. Cl.⁴ .............................................. B60R 11/00
[52] U.S. Cl. .................................. 296/37.6; 211/184; 217/31; 220/22; 224/42.42
[58] Field of Search ................ 296/37.6, 37.1; 217/30, 217/31; 220/22, 22.3; 224/42.42; 211/184; 248/DIG. 9

[56] References Cited

U.S. PATENT DOCUMENTS

| | | | |
|---|---|---|---|
| 1,554,077 | 9/1925 | Fay | 220/22 |
| 1,754,812 | 4/1930 | Zacharias | 220/22 |
| 2,105,645 | 1/1938 | Gemmill | 217/30 X |
| 2,226,184 | 12/1940 | Storer | 220/22 X |
| 2,268,637 | 1/1942 | Bernstein | 217/31 |
| 2,608,459 | 8/1952 | Malmquist | 220/22 X |
| 2,647,679 | 8/1953 | Schilling et al. | 217/30 X |
| 2,854,724 | 10/1958 | Wuorio | 217/30 X |
| 3,059,825 | 10/1962 | Thomas | 217/30 X |
| 3,640,445 | 2/1972 | Durham | 217/30 X |
| 3,698,568 | 10/1972 | Armstrong | 211/184 |
| 4,187,975 | 2/1980 | Shepherd | 217/31 X |
| 4,507,033 | 3/1985 | Boyd | 296/37.6 X |
| 4,595,246 | 6/1986 | Bross | 217/30 X |
| 4,693,382 | 9/1987 | Galen | 211/184 X |
| 4,746,053 | 5/1988 | Nichols | 217/30 X |

FOREIGN PATENT DOCUMENTS 2701786 7/1978 Fed. Rep. of Germany ..... 296/37.1

Primary Examiner—Dennis H. Pedder
Assistant Examiner—Andrew C. Pike
Attorney, Agent, or Firm—Andsel Group

[57] ABSTRACT

A portable divider assembly for dividing a pickup truck bed having a flat floor and spaced side walls into at least two smaller compartments without use of tools or modification of the truck bed and without attachment to the truck bed so that the divider assembly may be freely applied to compartmentalize the truck bed or removed to restore the truck bed to its non-compartmentalized condition. The portable divider assembly is formed from an elongated center divider panel and a plurality of cross member panels.

3 Claims, 1 Drawing Sheet

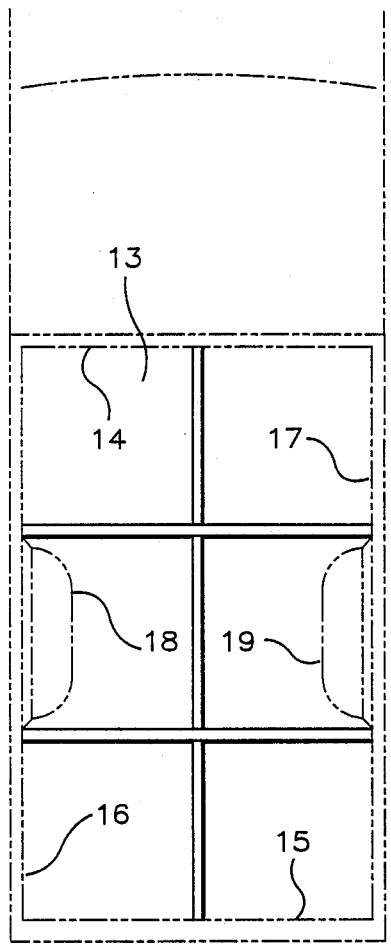
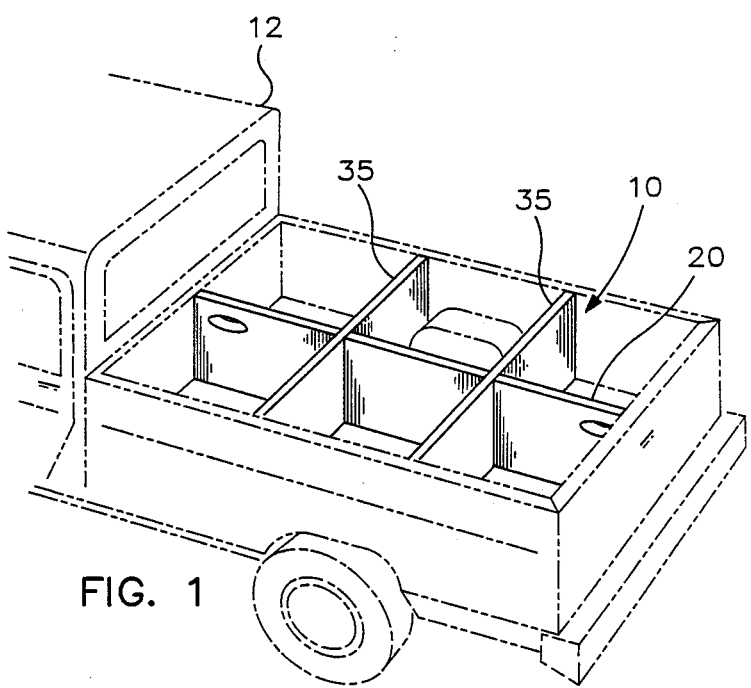
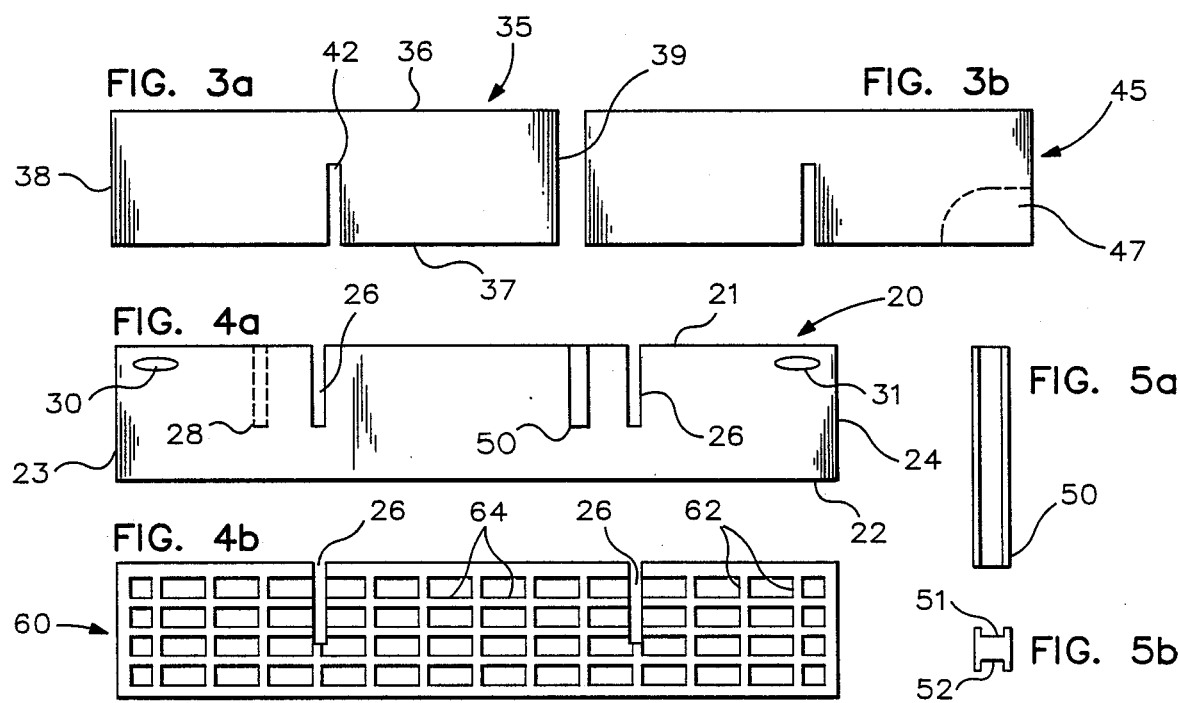

TRUCK BED DIVIDER ASSEMBLY

BACKGROUND OF THE INVENTION

The invention relates to dividers for pickup truck beds and particularly to a divider device that is portable, and which may be applied or removed easily and quickly without use of tools of any kind.

There are millions of pickup trucks on the road today. Each truck has various requirements from its owner. Some of those requirements will vary widely as the pickup truck owner performs various tasks, both personal and professional. There are times when items are damaged simply by inadequate restraint within the truck bed.

The inventor's device provides structure for instant compartmentalization of a truck bed. When hauling various types of materials each cell or compartment will maintain individual integrity. When no longer needed, the device is quickly removed and stored. Should dimensional requirements of compartments change, the device provides structure for simply moving a cell wall forward or backward to yield a new size of cell or compartment.

There is, therefore, a need for a device which is inexpensive and quickly added to any given pickup truck bed. The device increases the utility of the truck for the owner.

SUMMARY OF THE INVENTION

The inventor's novel truck bed divider assembly is a simple-to-use pickup truck bed divider partition system. Dividers of the instant device enable the user to divide a truck bed into several cells, each of which can be used separately for different items. The items held in the cells of the truck bed divider assembly will not slide around in the truck bed but will remain separated and not commingle.

The dividers will provide the user with structure for quickly creating separate compartments within the truck bed. The size of the compartments will vary according to which knockout grooves are used in setting up the dividing partitions. The material of the center divider panel and cross member panels is of a firm, lightweight material, such as polyurethane foam or fiberglass. Each partition will have pre-cut slots for exact size determination.

The truck bed divider assembly will quickly disassemble and lay flat when not in use. It can be stored in a minimum of space.

BRIEF DESCRIPTION OF THE DRAWINGS

FIG. 1 is a front perspective view illustrating applicant's novel truck bed divider assembly installed in the bed of a pickup truck;

FIG. 2 is a top plan view of FIG. 1;

FIG. 3a is a front elevation view of one of the cross member panels;

FIG. 3b is a front elevation view of an alternative cross member panel;

FIG. 4a is a front elevation view of the center divider panel;

FIG. 4b is a front elevation view of an alternative center divider panel;

FIG. 5a is a side elevation view of a notch plug; and

FIG. 5b is a top plan view of the notch plug.

DESCRIPTION OF THE PREFERRED EMBODIMENT

The inventor's novel truck bed divider assembly will now be described by referring to FIGS. 1-5b of the drawings. The truck bed divider assembly is generally designated numeral 10.

Pickup truck 12 has a truck bed formed from a floor 13, a front wall 14, a rear gate 15, and laterally spaced side walls 16 and 17. Wheel wells 18 and 19 extend inwardly from the respective sidewalls.

A vertically oriented elongated center divider panel 20 has a predetermined length and a predetermined height. It has a top edge 21, a bottom edge 22, a front edge 23, and a rear edge 24. A plurality of vertically oriented notches 26 extend downwardly from top edge 21 a predetermined distance. They are formed by pre-scoring the walls of the panel. Notches 26 originally are formed as pre-scored knock out members 28 that are knocked out when so desired. Hand grip apertures 30 and 31 are formed adjacent top edge 21.

Cross member panels 35 are vertically oriented and they have a predetermined length and a predetermined height. They also have a top edge 36, a bottom edge 37, and laterally spaced side edges 38 and 39. Notches 42 are formed in bottom edge 37 and they mate with notches 26 of center divider panel 20 to form a grid-like structure. In FIG. 3b an alternative cross member panel 45 is illustrated and it has a scored or pre-cut curved knockout panel 47 having a curved configuration to mate with the curvature of the wheel well.

In FIGS. 5a and 5b, notch plugs 50 are illustrated. It has grooves 51 and 52 in opposite lateral sides thereof that form flanges for interlocking with the center divider panel notches 26 when the notches are not used.

An alternative center divider panel 60 is illustrated in FIG. 4b and it has integrally formed vertical ribs 62 and horizontal ribs 64.

What is claimed is:

1. A pickup truck having a truck bed having a flat floor, a front wall, laterally spaced side walls, and a rear gate, in combination with a portable divider assembly for dividing said truck bed into at least four smaller compartments without use of tools or modification of the truck bed and without attachment to the truck bed so that the divider assembly may be freely applied to compartmentalize the truck bed or removed to restore the truck bed to a noncompartmentalized condition thereof comprising:

said truck bed having a predetermined length and a predetermined width, said side walls and rear gate having a predetermined height;

a vertically oriented elongated center divider panel having a predetermined length and a predetermined height substantially equal to the respective length and height of said truck bed, said center divider panel having a front edge, a rear edge, a top edge, and a bottom edge, and a plurality of longitudinally spaced vertically oriented notches extending downwardly from the top edge of said center divider panel for matingly receiving cross member panels, wherein some of said notches are sometimes open and not always used by cross member panels;

a plurality of vertically oriented cross member panels each having a predetermined length and a predetermined height substantially equal to the respective width and height of said truck bed, said cross member panels having a top edge, a bottom edge, and laterally spaced side edges, and a vertically oriented notch extending upwardly from the bottom edge of each of said cross member panels for matingly receiving said center divider panel;

said notches in said center divider panel being formed therein by prescoring the walls of the panel to define a knockout member; and notch plugs inserted into the open notches in said center divider panel, each of said notch plugs having spaced opposing lateral sides having grooves therein that form flanges for interlocking with said center divider panel notches when the notches of said center divider panel are not used by said cross member panels.

2. A combination as recited in claim 1 wherein said cross member panels have knockout panels having a curved configuration to mate with a curvature of a wheelwell.

3. A portable divider assembly as recited in claim 1 further comprising hand grip apertures in said center divider panel adjacent the top edge thereof.

* * * * *